United States Patent
Maki et al.

(10) Patent No.: US 9,382,685 B2
(45) Date of Patent: Jul. 5, 2016

(54) CONDUIT SUPPORT STRUCTURE FOR AN INDUSTRIAL MACHINE WITH SADDLE BLOCK

(71) Applicant: Harnischfeger Technologies, Inc., Wilmington, DE (US)

(72) Inventors: Douglas Maki, Germantown, WI (US); Ethan Pedretti, Holmen, WI (US); Anab Akanda, Ann Arbor, MI (US); Jason Gaska, Columbus, WI (US); Christopher Jones, Milwaukee, WI (US); Matthew Loew, Oconomowoc, WI (US); Andrew P. Dretzka, New Berlin, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 257 days.

(21) Appl. No.: 14/177,855

(22) Filed: Feb. 11, 2014

(65) Prior Publication Data

US 2014/0227071 A1     Aug. 14, 2014

Related U.S. Application Data

(60) Provisional application No. 61/789,361, filed on Mar. 15, 2013, provisional application No. 61/846,918, filed on Jul. 16, 2013, provisional application No. 61/763,099, filed on Feb. 11, 2013.

(51) Int. Cl.
| | |
|---|---|
| *E02F 9/22* | (2006.01) |
| *E02F 3/30* | (2006.01) |
| *E21C 27/30* | (2006.01) |
| *E02F 3/46* | (2006.01) |
| *F16L 3/015* | (2006.01) |

(52) U.S. Cl.
CPC . *E02F 3/304* (2013.01); *E02F 3/46* (2013.01); *E02F 9/2275* (2013.01); *E21C 27/30* (2013.01); *F16L 3/015* (2013.01)

(58) Field of Classification Search
CPC ............................... E02F 3/304; E02F 9/2275
See application file for complete search history.

(56) References Cited

U.S. PATENT DOCUMENTS

| | | |
|---|---|---|
| 3,219,213 A | 11/1965 | Learmont |
| 3,375,596 A | 4/1968 | Bacquie |

(Continued)

FOREIGN PATENT DOCUMENTS

GB         257043 A        8/1926

OTHER PUBLICATIONS

PCT/US2014/015786 International Search Report and Written Opinion dated May 30, 2014 (16 pages).

*Primary Examiner* — Gerald McClain
(74) *Attorney, Agent, or Firm* — Michael Best & Friedrich LLP

(57) ABSTRACT

An industrial machine includes a frame having a base and a boom, an arm movably coupled to the boom, an attachment, a conduit, a first member, and a second member. The boom has a first end coupled to the base and a second end opposite the first end. The arm includes a first end and a second end. The attachment is coupled to the first end of the arm. The conduit extends from the frame to the arm. The first member is pivotably coupled to the frame and supports a first portion of the conduit as the arm moves relative to the boom. The second member is pivotably coupled between the first member and the arm, and supports a second portion of the conduit as the arm moves relative to the boom.

8 Claims, 20 Drawing Sheets

(56) References Cited

U.S. PATENT DOCUMENTS

| | | | | |
|---|---|---|---|---|
| 3,399,909 A | * | 9/1968 | Ambrose | B60D 1/62 137/615 |
| 3,776,403 A | * | 12/1973 | Billings | E02F 9/2275 414/692 |
| 3,901,270 A | | 8/1975 | Smith | |
| 4,134,221 A | | 1/1979 | Scodeller | |
| 4,156,436 A | | 5/1979 | Hawk | |
| 4,221,531 A | | 9/1980 | Baron et al. | |
| 4,457,338 A | * | 7/1984 | Moller | E21B 43/26 137/615 |
| 4,468,166 A | * | 8/1984 | Jameson | E21B 43/26 141/231 |
| 4,502,505 A | * | 3/1985 | Moller | E21B 43/26 137/615 |
| 4,510,971 A | * | 4/1985 | Bunnelle | B66C 23/18 137/615 |
| 4,542,940 A | * | 9/1985 | Marten | E02F 3/188 173/8 |
| 5,108,253 A | | 4/1992 | Kobayashi et al. | |
| 5,408,767 A | | 4/1995 | Hazama et al. | |
| 5,806,313 A | | 9/1998 | Koshi et al. | |
| 5,820,074 A | | 10/1998 | Trommer et al. | |
| 5,822,892 A | | 10/1998 | Ohbatake et al. | |
| 6,336,280 B1 | * | 1/2002 | Haigh | E02F 9/2275 37/352 |
| 7,143,839 B2 | * | 12/2006 | Neufeld | A01B 59/042 172/776 |
| 2012/0195729 A1 | | 8/2012 | Hren et al. | |

* cited by examiner

CONDUIT SUPPORT STRUCTURE FOR AN INDUSTRIAL MACHINE WITH SADDLE BLOCK

CROSS-REFERENCE TO RELATED APPLICATIONS

This application claims the benefit of U.S. Provisional Patent Application No. 61/763,099, filed Feb. 11, 2013, U.S. Provisional Patent Application No. 61/789,361, filed Mar. 15, 2013, and U.S. Provisional Patent Application No. 61/846,918, filed Jul. 16, 2013. The entire contents of these applications are incorporated by reference herein.

BACKGROUND

The present invention relates to industrial machines. Specifically, the present invention relates to a conduit support system for an earthmoving machine.

Conventional rope shovels include a boom and a handle coupled to the boom for rotational and translational movement. A bucket or dipper is attached to the handle and is supported by a cable or rope that passes over an end of the boom. The rope is secured to a bail that is pivotably coupled to the dipper. During the hoist phase, the rope is reeled in by a hoist drum, upwardly lifting the dipper through a bank of material and liberating a portion of the material. Generally, the orientation of the dipper relative to the handle is fixed and is not controlled independently of the handle and the hoist rope.

SUMMARY

In one aspect, the invention provides an industrial machine including a frame having a base and a boom, an arm movably coupled to the boom, an attachment, a conduit, a first member, and a second member. The boom has a first end coupled to the base and a second end opposite the first end. The arm includes a first end and a second end. The attachment is coupled to the first end of the arm. The conduit extends from the frame to the attachment. The first member is pivotably coupled to the frame and supports a first portion of the conduit as the arm moves relative to the boom. The second member is pivotably coupled between the first member and the arm, and supports a second portion of the conduit as the arm moves relative to the boom.

In another aspect, the invention provides a conduit support system for an industrial machine having a frame supporting a boom, an arm having a first end and a second end and supported for translational and rotational movement relative to the boom, and an attachment coupled to the first end of the arm. The conduit support system includes a conduit for providing communication between a source on the frame and the attachment, a first member, and a second member. The first member is configured to be pivotably coupled to the frame and supports a first portion of the conduit. The second member is configured to be pivotably coupled to the arm and is movable relative to the first member. The second member supports a second portion of the conduit.

In yet another aspect, the invention provides an industrial machine including a frame having a base and a boom coupled to the base, an arm movably coupled to the boom, a conduit extending between the frame and the arm, and a support structure. The boom has a first end and a second end opposite the first end. The arm includes a first end, a second end, and an attachment coupled to the first end of the arm. The support structure is coupled to at least a portion of the conduit. The support structure is movable relative to at least one of the frame and the arm to support the conduit in response to movement of the arm relative to the frame.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
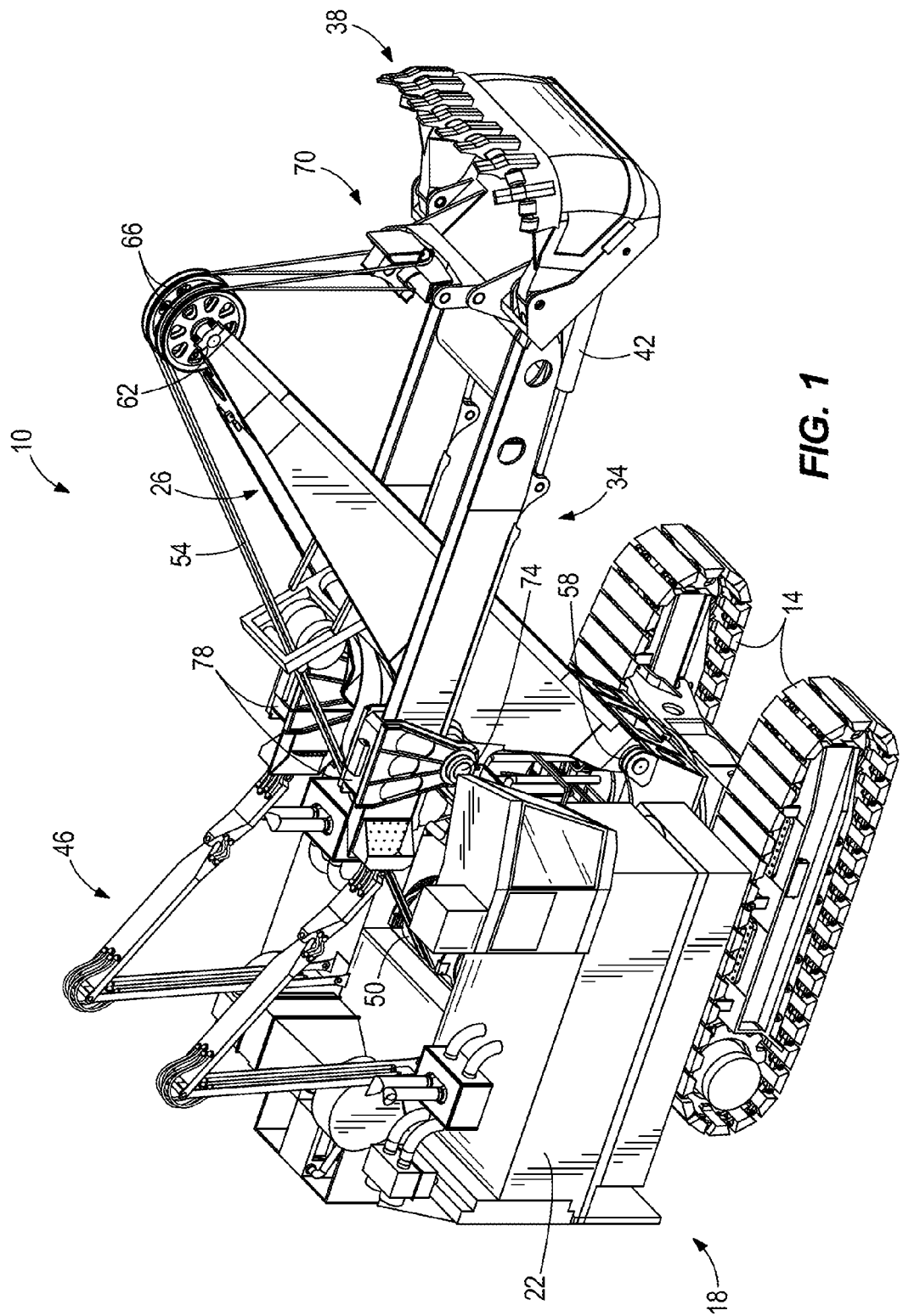
FIG. 1 is a perspective view of a mining shovel.

FIG. 1 shows an industrial machine, such as a mining shovel 10, supported by tracks 14 a support surface or ground (not shown). The shovel 10 includes a frame 18 including a base 22 supporting a boom 26 and a fluid source 30 (e.g., a fluid pump and/or reservoir—FIG. 3). The shovel 10 further includes an elongated member or handle 34, an attachment or bucket 38 including pivot actuators 42, and a conduit support structure 46. The base 22 includes a rotational structure for rotating about an axis of rotation (not shown) that is generally perpendicular to a plane corresponding to a grade of the support surface. The base 22 also includes a hoist drum 50 for reeling in and paying out a cable or rope 54. Although the conduit support structure 46 is described with respect to the shovel 10, the linkage 46 may be used on other industrial machines, including other mining machines.

The boom 26 includes a first end 58 coupled to the base 22 and a second end 62 opposite the first end 58. In the illustrated embodiment, the first end 58 is pivotable relative to the base 22 by a pin joint. The boom 26 further includes a boom sheave 66 coupled to the second end 62. The boom sheave 66 guides the rope 54 over the second end 62 of the boom 26. The rope 54 is coupled to the bucket 38 by a bail assembly 70, which is pivotably coupled to the bucket 38 in the illustrated embodiment. The bucket 38 moves toward the boom sheave 66 as the rope 54 is reeled in by the hoist drum 50 and the bucket 38 moves away from the boom sheave 66 as the rope 54 is paid out. In some embodiments, the bail assembly 70 includes an equalizer for maintaining the rope 54 in an orientation that is generally tangent to the boom sheave 66.

Figure 2:
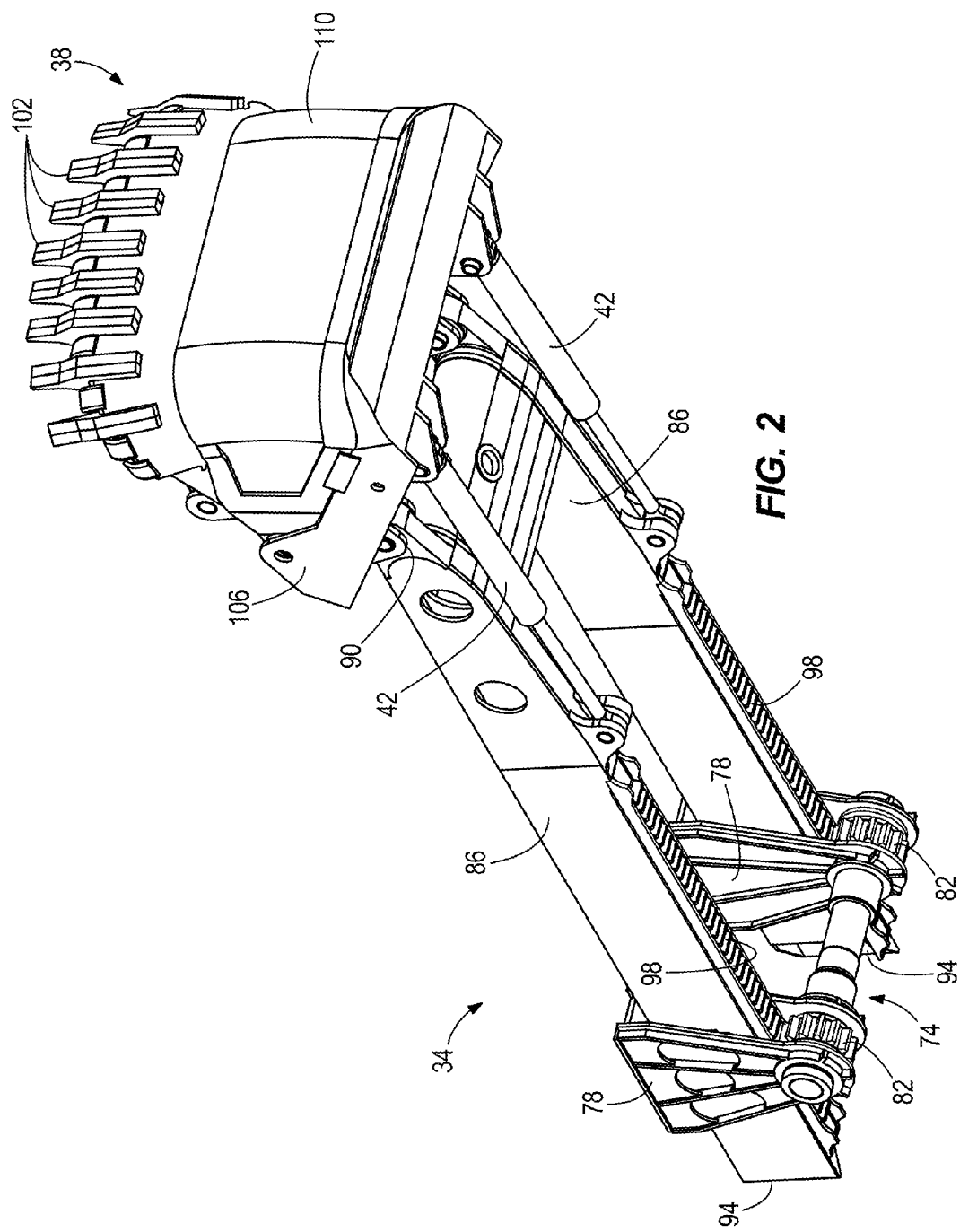
FIG. 2 is a perspective view of a handle, a bucket, saddle blocks, and a shipper shaft of the shovel shown in FIG. 1.

The boom 26 also includes a shipper shaft 74 and a pair of saddle blocks 78. The shipper shaft 74 extends through the boom 26 and is positioned between the first end 58 and the second end 62 of the boom 26. In the illustrated embodiment, the shipper shaft 74 is rotatable about an axis defined by the shipper shaft 74 and oriented transverse to a longitudinal axis of the boom 26. The shipper shaft 74 includes pinions 82 (FIG. 2). The saddle blocks 78 are rotatably coupled to the shipper shaft 74 and are rotatable relative to the boom 26. In one embodiment, each saddle block 78 is a three-piece saddle block having two parallel side portions and a top portion extending between the side portions.

As shown in FIG. 2, the handle 34 includes a pair of parallel arms 86 and defines a first end 90 and a second end 94. The first end 90 is pivotably coupled to the bucket 38. The second end 94 is movably received in the saddle blocks 78. In the illustrated embodiment, the handle arms 86 are positioned on either side of the boom 26 (FIG. 1) and movably pass through each saddle block 78 such that the handle 34 is capable of rotational and translational movement relative to the boom 26. Hoisting of the ropes 54 rotates the handle 34 and saddle block 78 about the shipper shaft 74 relative to the boom 26. The handle 30 is also linearly extendable relative to the saddle block 58. In the illustrated embodiment, each arm 86 includes a rack 98 for engaging a pinion 82 of the shipper shaft 74, forming a rack-and-pinion coupling between the handle 34 and the boom 26. Rotation of the shipper shaft 74 about its axis moves the rack 98 along the shipper shaft 74, facilitating translational movement of the handle 34 relative to the boom 26.

The bucket 38 is used to excavate a desired work area, collect material, and transfer the collected material to a desired location (e.g., a material handling vehicle). The bucket 38 includes teeth 102 for engaging a bank of material. Each pivot actuator 42 is coupled between the bucket 38 and the handle 34 and actively controls the pitch of the bucket 38 (i.e., the angle of the bucket 38 relative to the handle 34) by rotating the bucket 38 about the handle first end 90. In the illustrated embodiment, the pivot actuators 42 are hydraulic cylinders. Also, in the illustrated embodiment, the bucket 38 is a clamshell-type bucket 38 having a rear wall 106 and a main body 110 movable relative to the rear wall 106. The main body 110 is selectively moved away from the rear wall 106 to empty the contents of the bucket 38. The main body 110 may be actuated by one or more bucket cylinders (not shown). In other embodiments, the shovel 10 may include other types of attachments, buckets, or dippers.

Figure 3:
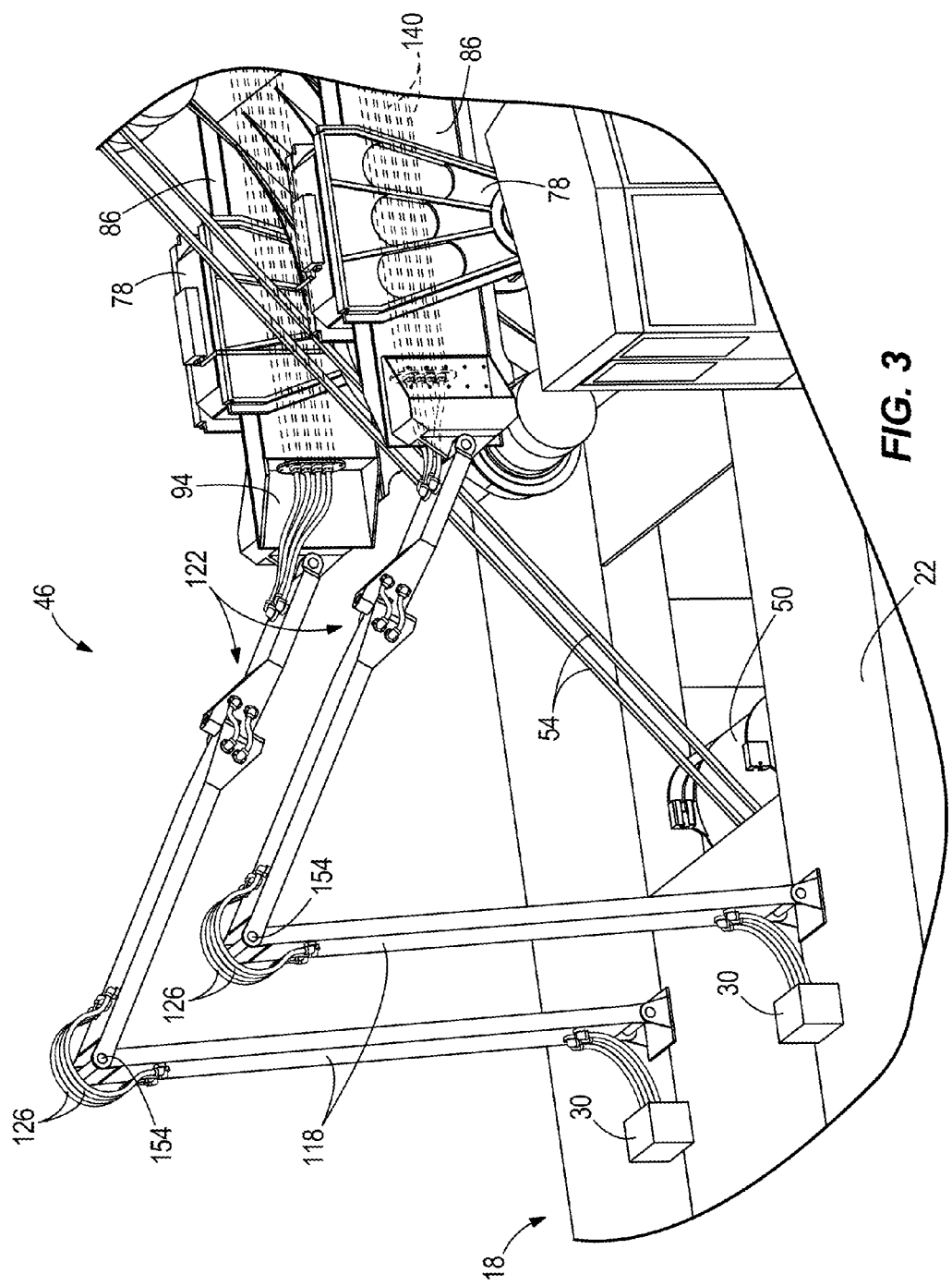
FIG. 3 is an enlarged perspective view of a conduit support structure.

Referring to FIG. 3, the conduit support structure 46 includes first member or link 118 and a second member or link 122. In the illustrated embodiment, the support structure 46 includes a pair of links 118, 122, each of which is coupled to one of the handle arms 86. The first link 118 is pivotably coupled between the frame 18 and the second link 122, and the second link 122 is pivotably coupled between the first link 118 and the handle arm 86. The links 118, 122 are coupled to each other at a joint 154. In the illustrated embodiment, the joint 154 and the joints coupling the links 118, 122 to the shovel are pin joints; in other embodiments, the joints may be a spherical bearing, a ball-in-socket connection, or some other type of joint. Conduits 126 extend substantially along the length of the first link 118 and the second link 122. The conduits 126 are coupled to the first link 118 and the second link 122 and bend around the joint 154 between the first link 118 and the second link 122. In the illustrated embodiment, the portions of the conduits 126 that are coupled to the links 118, 122 are fixed tubes, and a flexible portion extends around the connection between the links 118, 122. The flexible portion is prevented from bending beyond a minimum bend radius of the conduit in response to movement of the handle 34.

Figure 4:
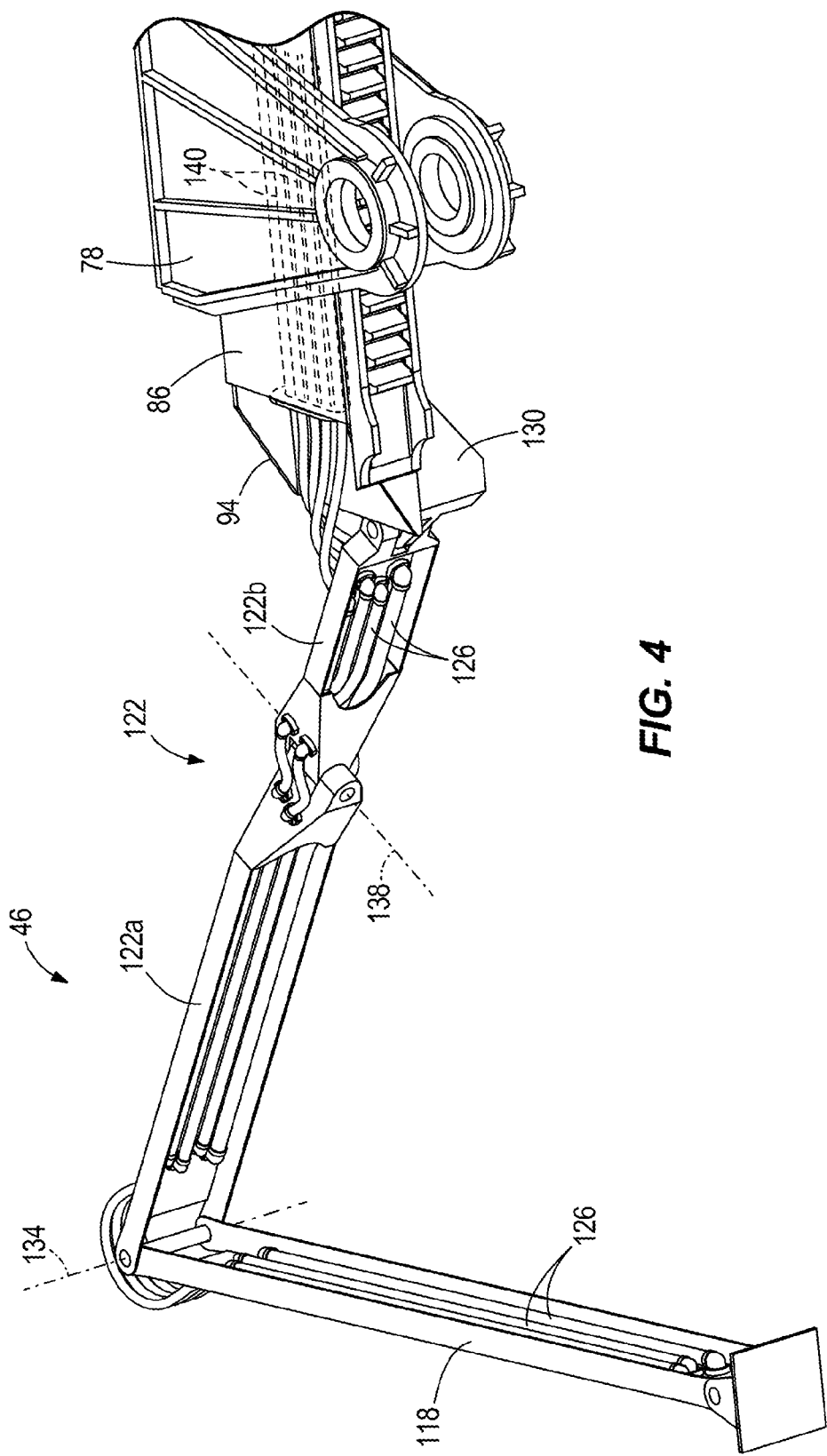
FIG. 4 is a lower perspective view of the conduit support structure of FIG. 3 and a portion of a handle.

As shown in FIG. 4, the second link 122 includes a first portion 122a, a second portion 122b pivotably coupled to the first portion 122a, and an attachment plate 130 secured to the handle arm 86. The attachment plate 130 is pivotably coupled to the second portion 122b, such as by a spherical bushing or a cylindrical bushing. While the second link 122 pivots about a first axis 134 relative to the first link 118, the second portion 122b pivots about a second axis 138 relative to the first portion 122a. The conduits 126 bend around the connection between the first portion 122a and the second portion 122b. During operation of the shovel 10, the sides of the bucket 38 may be unevenly loaded, causing the handle 34 to deflect laterally relative to the saddle blocks 78 or move in a plane that is generally perpendicular to a longitudinal axis of the handle 34. The pivotable coupling between the first portion 122a and the second portion 122b provides an additional direction of articulation to accommodate lateral or torsional motion of the handle 34 and prevents the first link 118 and the second link 122 from binding. In the illustrated embodiment, the second axis 138 is perpendicular to the first axis 134. In other embodiments, the second axis 138 may be positioned at another angle relative to the first axis 134. In still other embodiments, the second link 122 may be formed as a solid member without articulating portions 122a and 122b.

In one embodiment, the movement of the links 118, 122 relative to one another may be limited (e.g., by a mechanical stop) to never move beyond a minimum angle between the first link 118 and the second link 122 so that the conduits 126 do not bend beyond a minimum bend radius. In other embodiments, the coupling between the first link 118 and the second link 122 may include a rotary union or fluid swivel to provide fluid communication between the portion of each conduit 126 coupled to the first link 118 and the portion of each conduit 126 coupled to the second link 122. The rotary union eliminates the need for a flexible conduit portion and provides fluid flow through the conduits 126 when the articulating links 118, 122 are in virtually any position, without being limited by a bend radius of the conduits 126. Finally, in the illustrated embodiment, the conduit support structure 46 is not independently powered, but instead follows the motion of the handle 34 as the handle 34 is driven by the crowd and hoist forces. In other embodiments, the links 118, 122 are driven to pivot by an independent power source in response to movement of the handle 34.

In the embodiment of FIG. 3, the conduits 126 are in fluid communication with the fluid source 30 positioned on the base 22. The conduits 126 are also in fluid communication with second conduits 140 extending along the handle 34 and providing fluid to the pivot actuators 42 (FIG. 2) and bucket cylinders. In addition, the conduits 126, 140 may transmit multiple types of fluids in separate lines at different pressures. The conduits 126, 140 may convey lubricative medium (e.g., grease) to the handle 34 in order to lubricate mechanical connections on the handle 34 and bucket 38. The lubrication medium may include liquid, solid, or semi-solid lubricant. In still other embodiments, the conduits 126, 140 provide electrical communication between the bucket 38 and the frame 18 to convey signals between the bucket 38 and a controller and/or to convey electric power to an electric actuator for operating the bucket 38. In one embodiment, the conduits 140 are supported in a cartridge that is removably coupled to the handle arm 86, similar to the cartridge described in U.S. patent application Ser. No. 14/045,744, filed Oct. 3, 2013, the entire contents of which are incorporated herein by reference.

Figure 5:
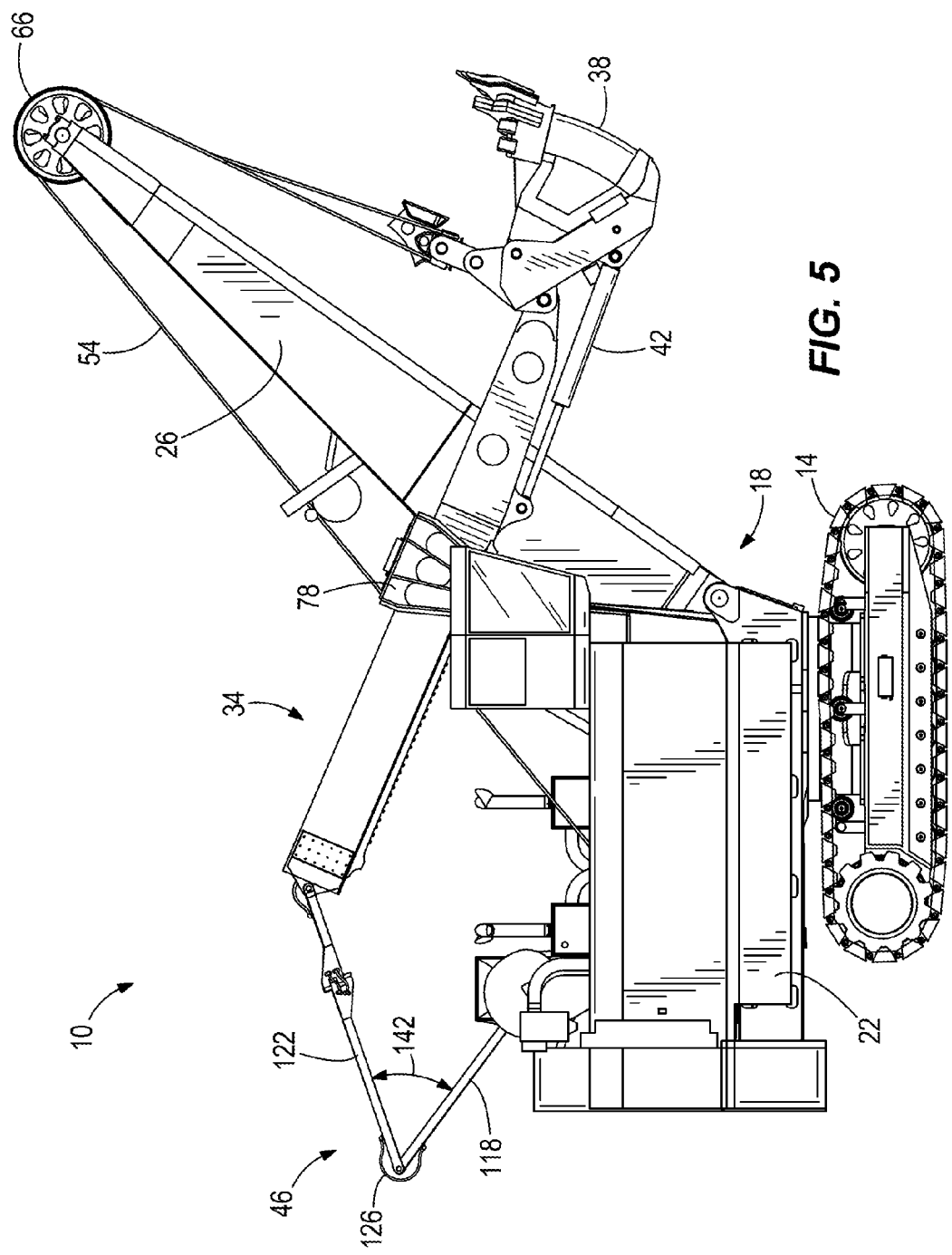
FIG. 5 is a side view of the shovel of FIG. 1, with the handle in a raised, retracted position.
Figure 6:
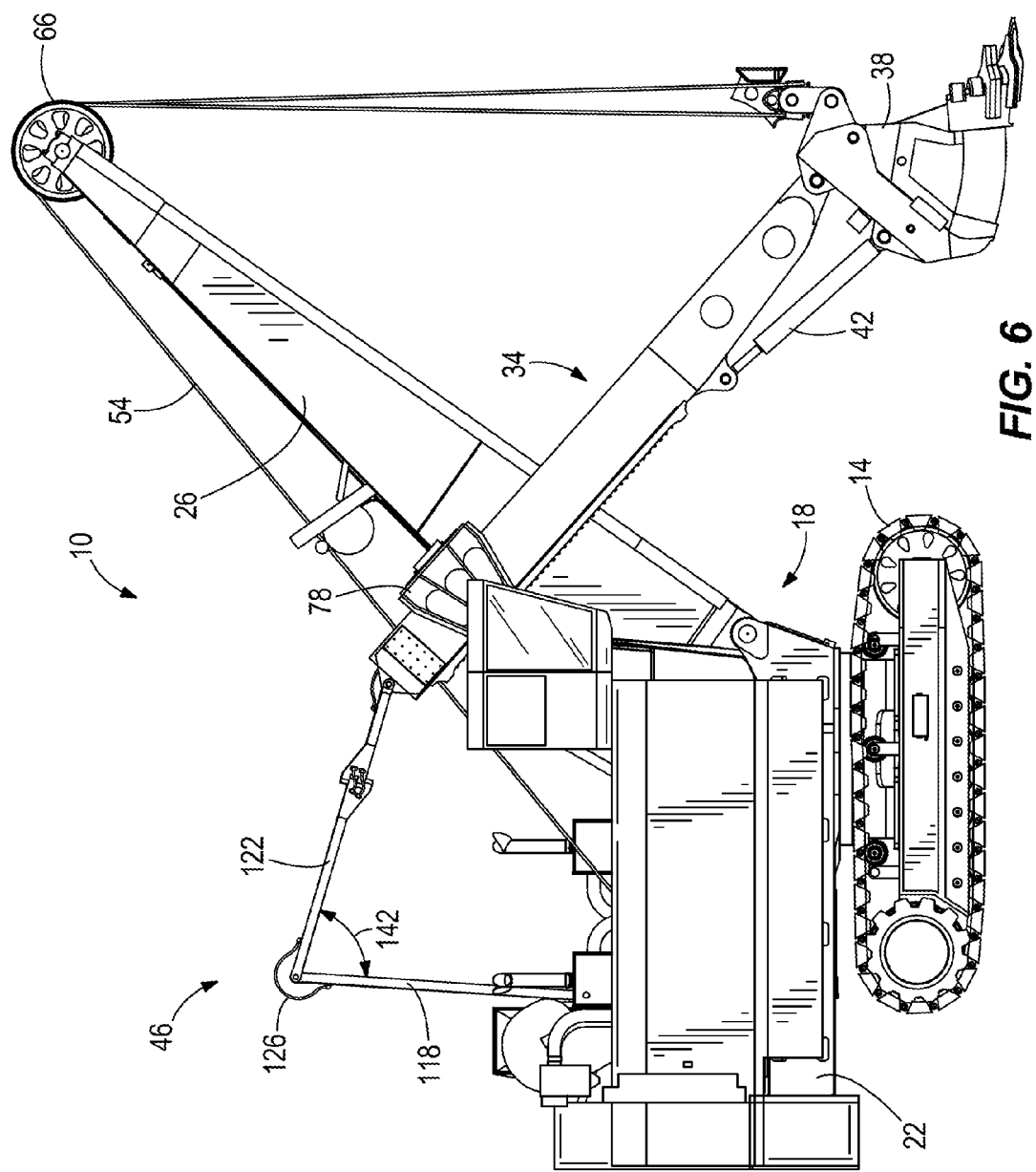
FIG. 6 is a side view of the shovel of FIG. 1, with the handle in a lowered, extended position.
Figure 7:
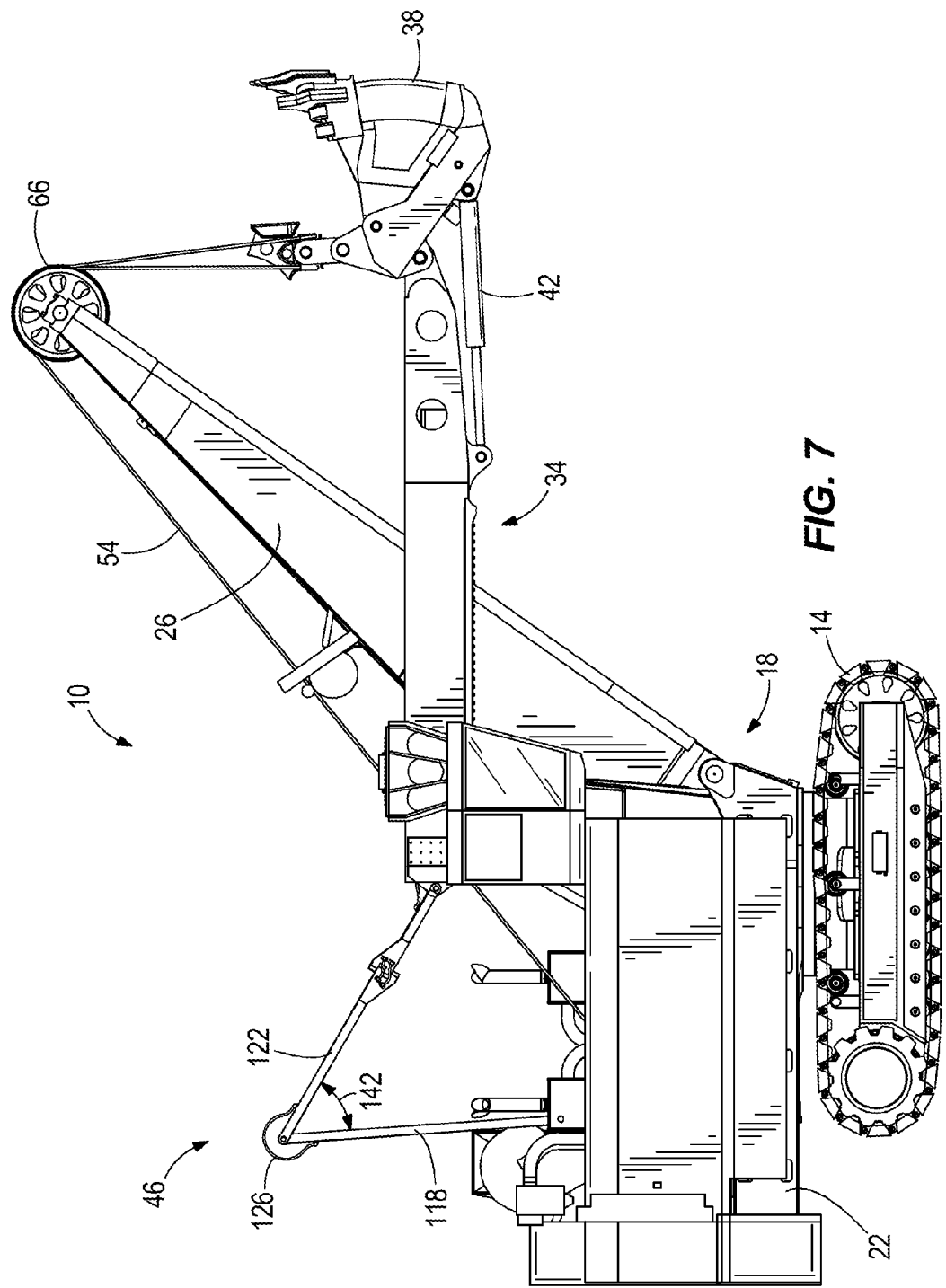
FIG. 7 is a side view of the shovel of FIG. 1, with the handle in a raised, extended position.

FIGS. 5-7 illustrate multiple possible positions for the handle 34 during operation of the shovel 10. The handle 34 rotates and moves translationally with respect to the frame 18. The links 118, 122 define a first end of the support structure 46 coupled to the frame 18 and a second end coupled to the handle 34. The distance between the first end and the second end is variable to accommodate the movement between the handle 34 and the boom 26 during operation. As the handle 34 moves from a retracted portion (FIG. 5) to an extended position (FIG. 6), the links 118, 122 move apart from one another, such that an included angle 142 between the links 118, 122 increases. As the handle 34 moves toward the retracted position (FIG. 5), the links 118, 122 pivot toward one another, decreasing the angle 142. In addition, as the handle 34 moves from a lowered position (FIG. 6) to a raised position (FIG. 7), the angle 142 decreases. The articulation of the links 118, 122 accounts for any "slack" in the conduits 126 and reduces the likelihood that the conduits 126 will snag on nearby obstacles or structures. The conduit support structure 46 simplifies the complexity of conveying fluid across the connection that permits rotational and translational movement of the handle 34 relative to the boom 26, thereby providing pressurized fluid, electric power, or electrical signals to the attachment 38 throughout the full range of motion of the handle 34. Among other things, the conduit support structure 46 permits active control of the attachment's movement, increasing the range of motion and efficiency of the attachment 38.

Figure 8:
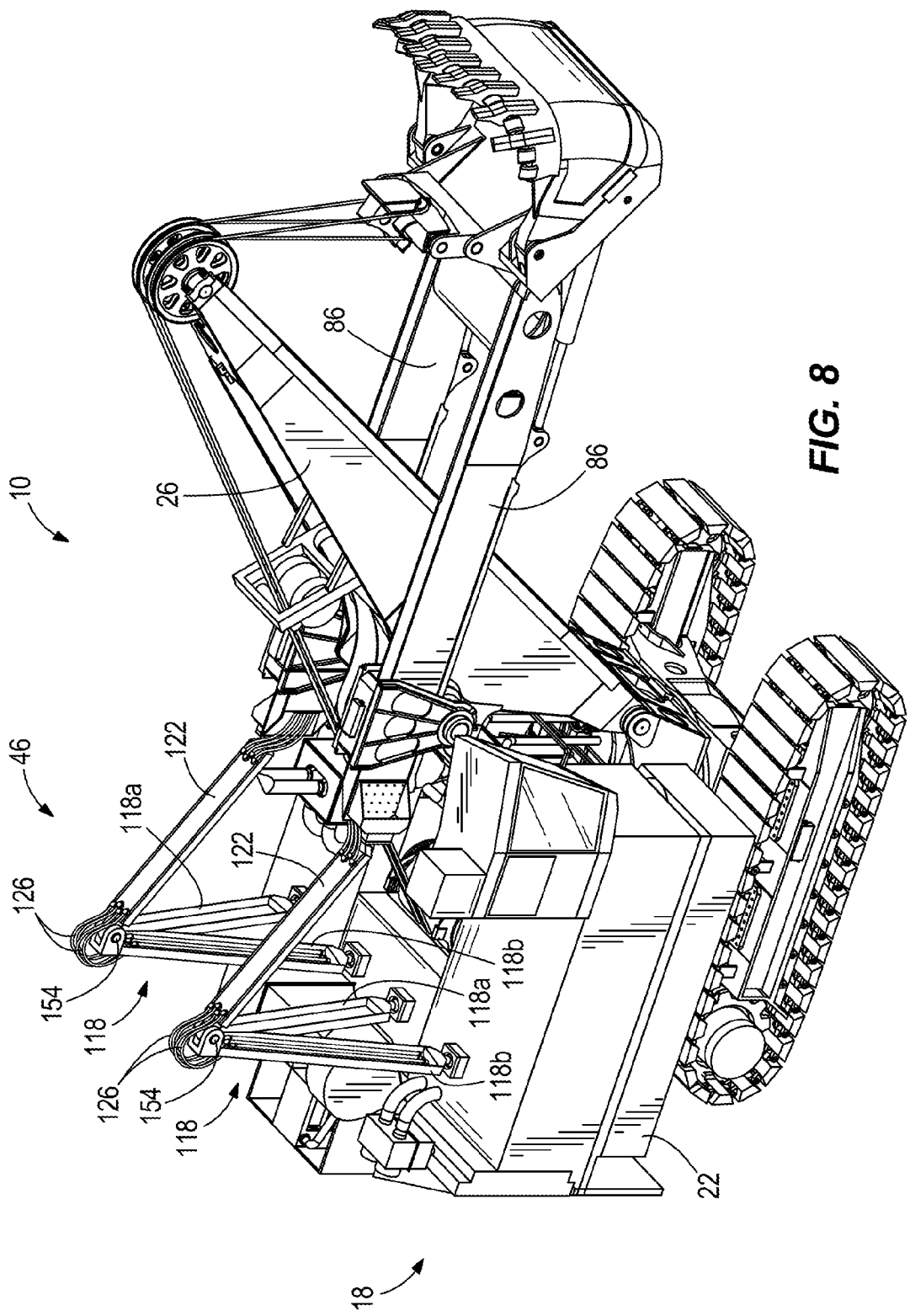
FIG. 8 is a perspective view of a mining shovel including a conduit support structure according to another embodiment.
Figure 9:
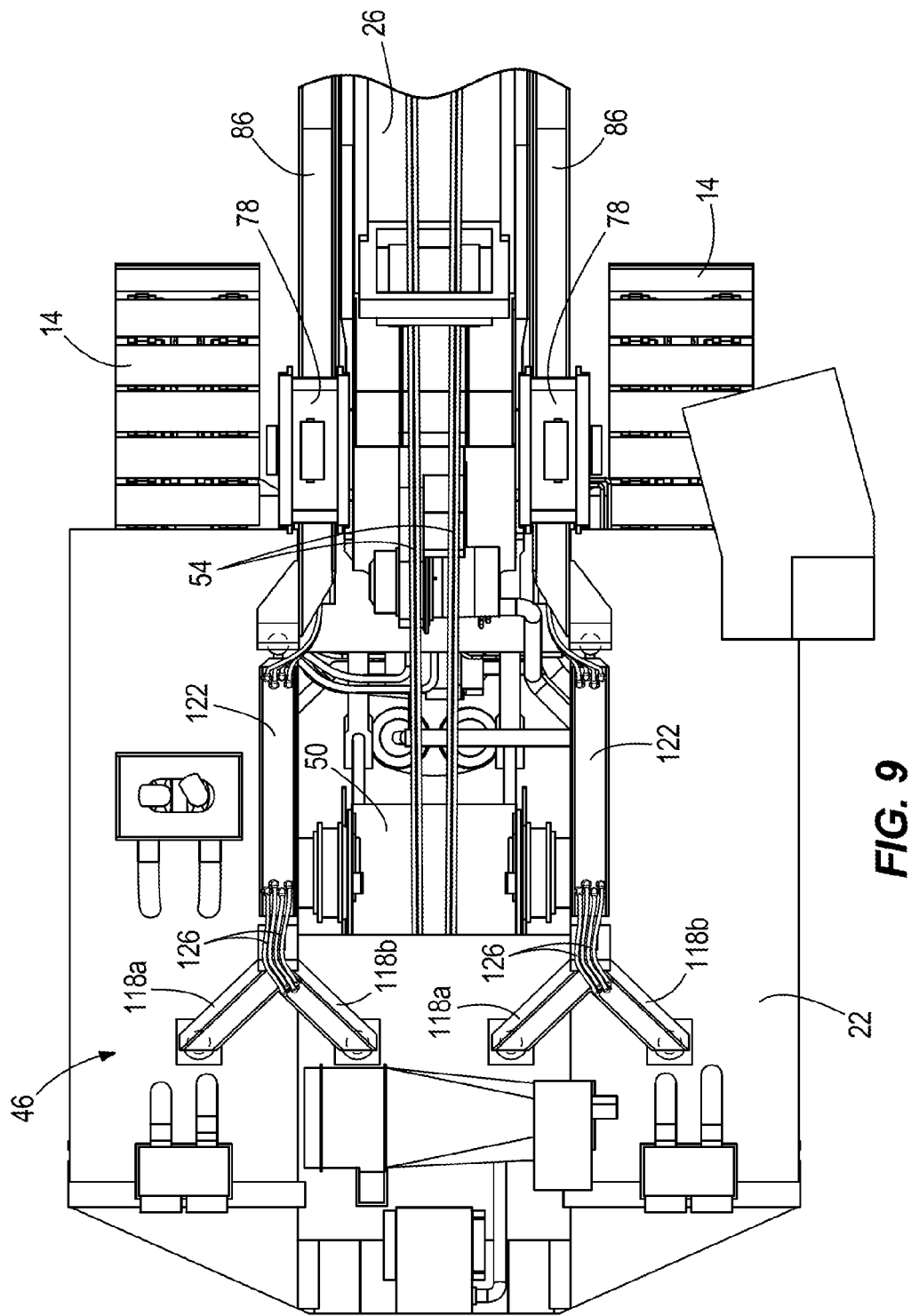
FIG. 9 is a top view of a portion of the shovel and the conduit support structure of FIG. 8.

FIGS. 8 and 9 illustrate another embodiment of the conduit support structure 46 in which the first link 118 is shaped as a chevron including a pair of legs 118a, 118b having ends that are each pivotably coupled to the base 22 at ball-in-socket joints. The legs 118a, 118b are joined together at an apex and are coupled to the second link 122 at a joint 154. In the illustrated embodiment, the joint 154 is a pin connection; in other embodiments, the joint 154 may be a spherical bearing, a ball-in-socket connection, or some other type of joint. The chevron shape of the first link 118 distributes the stress in the couplings and reduces wear on the first link 118.

In other embodiments, both the first link and the second link are formed as chevrons including a pair of legs and each leg of the second link is pivotably coupled to one of the handle arms 86. The support structure 46 may include one first link and one second link that are pivotably coupled by, for example, a single spherical or ball-in-socket connection joining the apex of each link.

Figure 10:
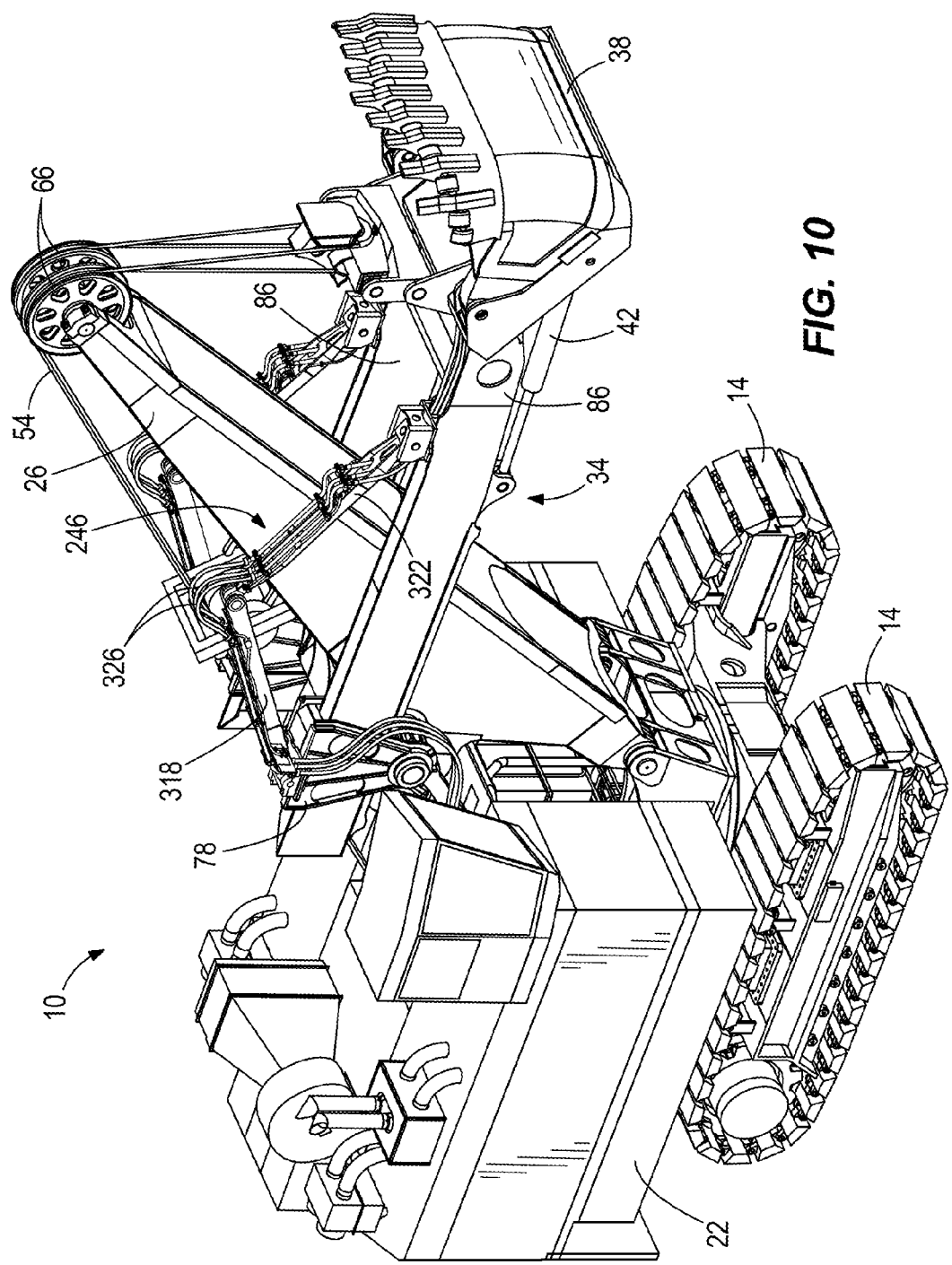
FIG. 10 is a perspective view of a mining shovel including a conduit support structure according to another embodiment.
Figure 11:
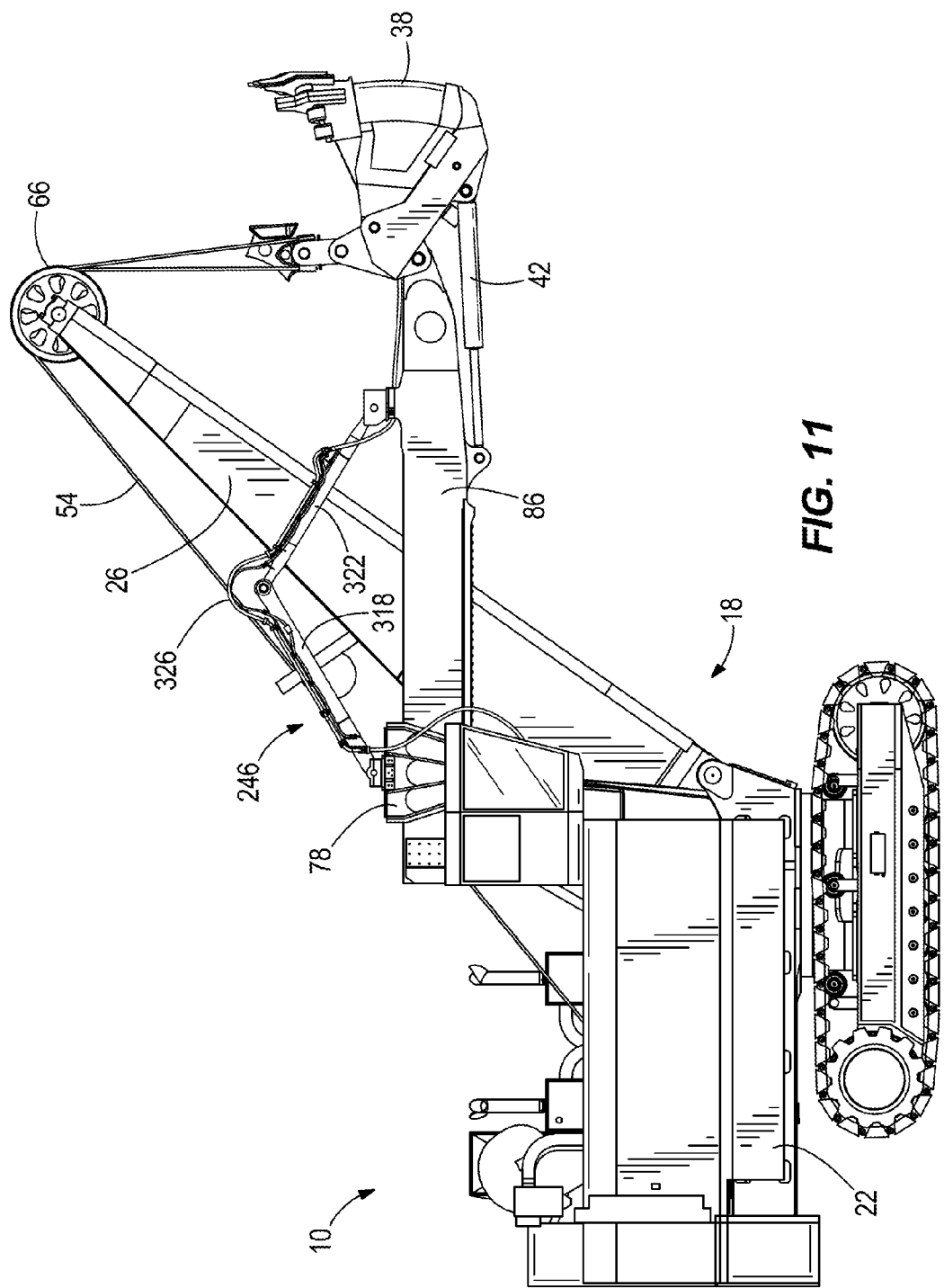
FIG. 11 is a side view of the mining shovel and conduit support structure of FIG. 10.
Figure 12:
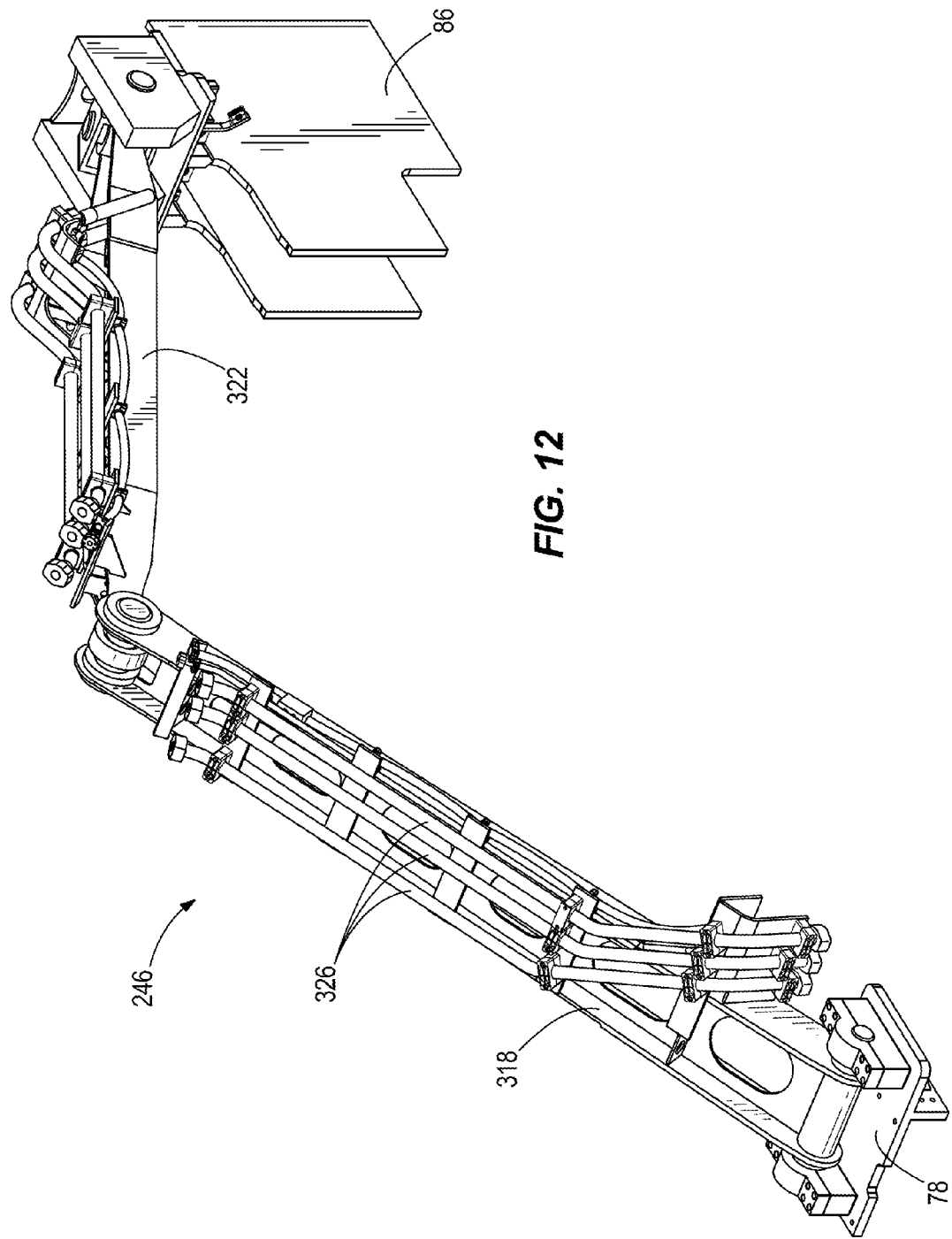
FIG. 12 is a perspective view of the conduit support structure of FIG. 10.

FIGS. 10-12 illustrate another embodiment of a conduit support structure 246. For brevity, only differences between the conduit support structure 246 and the conduit support structure 46 will be described in detail. Similar parts are identified with the same reference number, plus 200.

As shown in FIGS. 10-12, a first link 318 is coupled to the saddle block 78, while a second link 322 is coupled between the first link 318 and a portion of the handle 34 between the first end 90 and the second end 94. The first link 318 defines a first end of the support structure 246 that is pivotably coupled to the top of the saddle block 78, and the second link 322 defines a second end of the support structure 246 that is pivotably coupled to the top of the handle 34. Both links 318, 322 support fixed conduit portions for conveying hydraulic fluid, lubricative fluid, and/or electrical wire.

As shown in FIG. 11, the conduits 326 include a flexible portion extending in a curved, S-shape manner from the base 22 along a side surface of the saddle block 78 to the first link 318. As in the embodiment of FIG. 1, a flexible portion extends around the joint between the first link 318 and the second link 322. The conduits 326 include both fluid lines for conveying pressurized fluids and electrical lines. In the illustrated embodiment, the conduits 326 extend below the end of the second link 322 that is coupled to the handle 34. The conduits 326 extend along an upper edge of the handle 34 to a manifold (not shown) positioned on the rear wall 106 of the bucket 38. Fluid (e.g., hydraulic fluid, lubricative fluid) is conveyed to the manifold where it is then diverted to the pivot actuators 42 or mechanical connections.

As best shown in FIG. 12, the first link 318 is pivotably coupled to the saddle block 78 by a pin joint or a cylindrical bushing, while the second link 322 is pivotably coupled to the arm 86 of the handle 34 by a universal joint or U-joint. The U-joint includes a first portion that pivots about a first axis and a second portion that pivots about a second axis that is generally perpendicular to the first axis. The structure of a universal joint is well-known to a person of ordinary skill, and therefore is not described in further detail. In addition, the pivot joint between the first link 318 and the second link 322 is a spherical coupling. As used herein, a spherical coupling may include a cylindrical pin extending between the ends of the first link 318 and the second link 322 and encapsulated within one or more spherical bushings that are pivotable relative to a first link 318 and the second link 322. In other embodiments, the spherical coupling includes a ball-in-socket connection. In still other embodiments, the spherical coupling includes a roller bearing having a plurality of roller elements with a spherical shape or aspect. The types of couplings described above can be incorporated into any of the connection joints in the support structure 246. For example, the connection between the second link 322 and the handle arm 86 could be a cylindrical pin joint instead of a U-joint.

Figure 13:
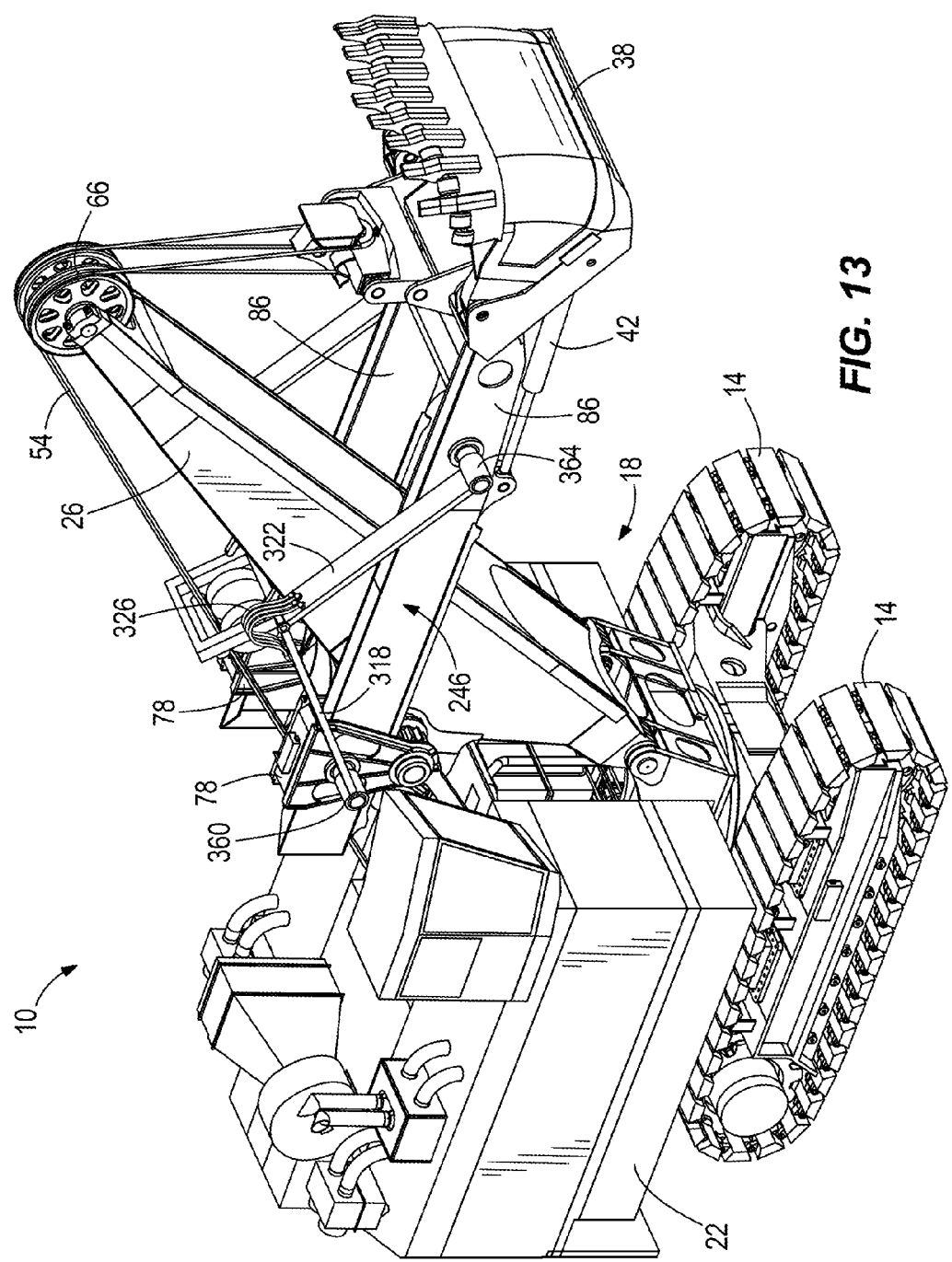
FIG. 13 is a perspective view of a mining shovel including a conduit support structure according to another embodiment.
Figure 14:
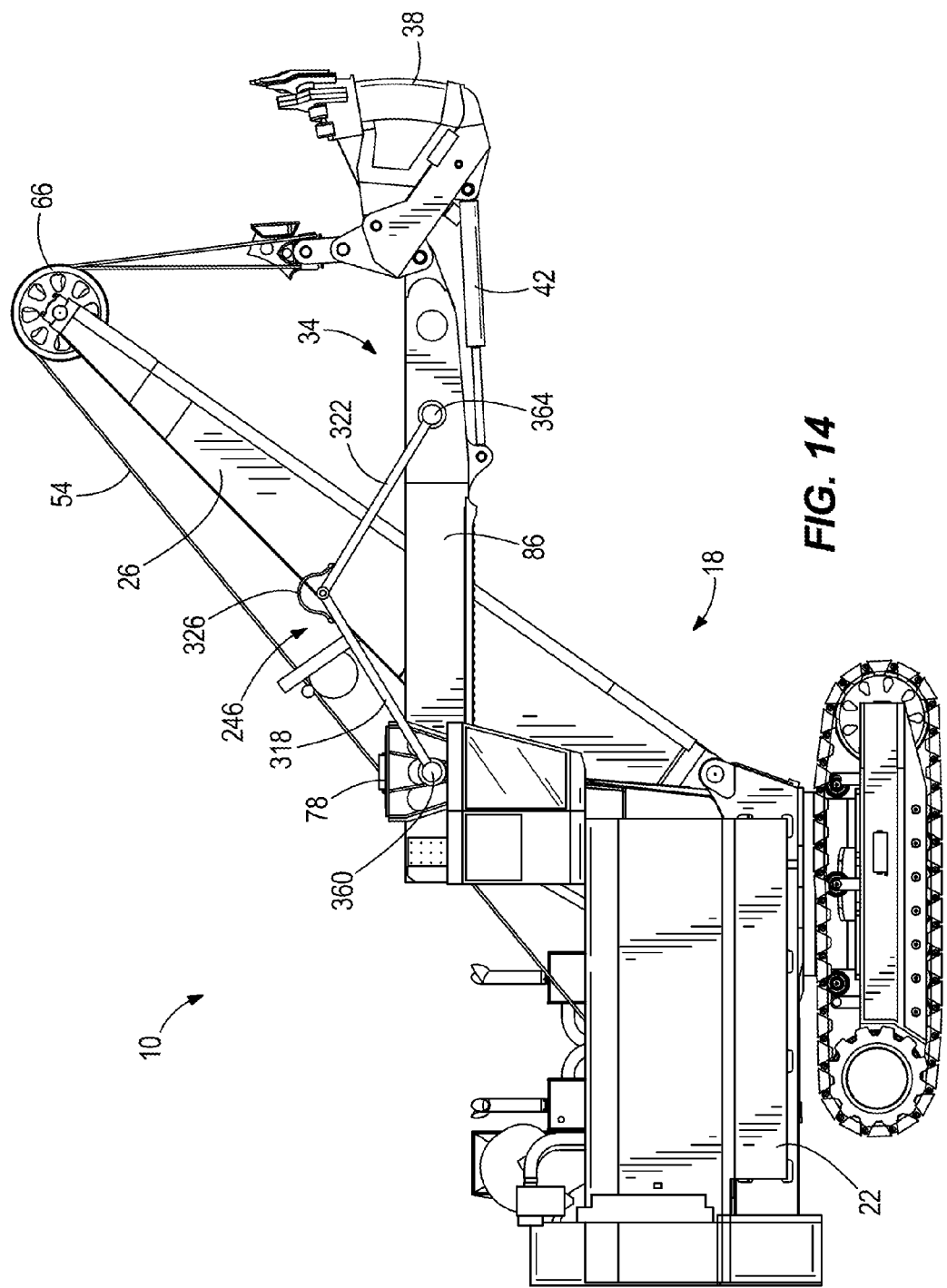
FIG. 14 is a side view of the mining shovel and conduit support structure of FIG. 13.

FIGS. 13 and 14 illustrate another embodiment in which the first link 318 is pivotably coupled to a side of the saddle block 78 by a first rotary union or fluid swivel 360 in fluid communication with the fluid source 30 (not shown). The second link 322 is pivotably coupled to the side of the handle 34 at a second rotary union 364. The swivels 360, 364 convey fluid through the pivoting joints to the conduits 326 on the links 318, 322. In other embodiments, the first link 318 is coupled to the shipper shaft 74 and the second link 322 is coupled between the first link 318 and the handle 34.

Figure 15:
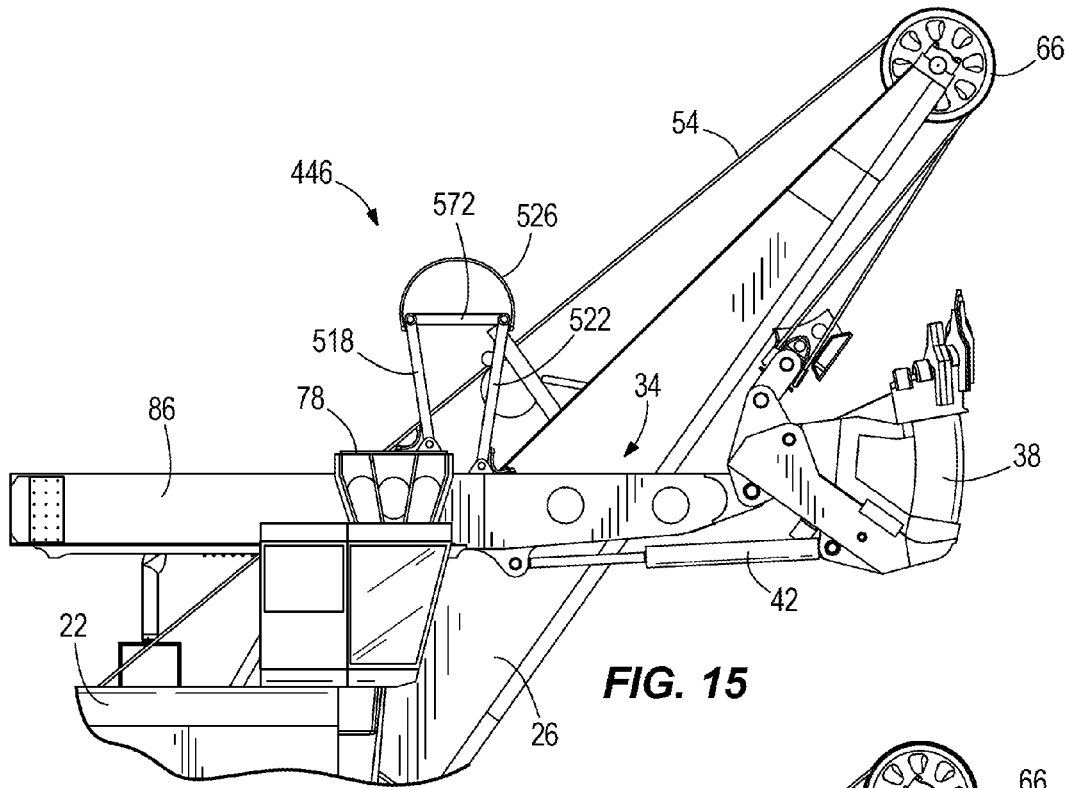
FIG. 15 is a side view of a portion of a mining shovel including a conduit support structure according to another embodiment, with the handle in a retracted position.
Figure 16:
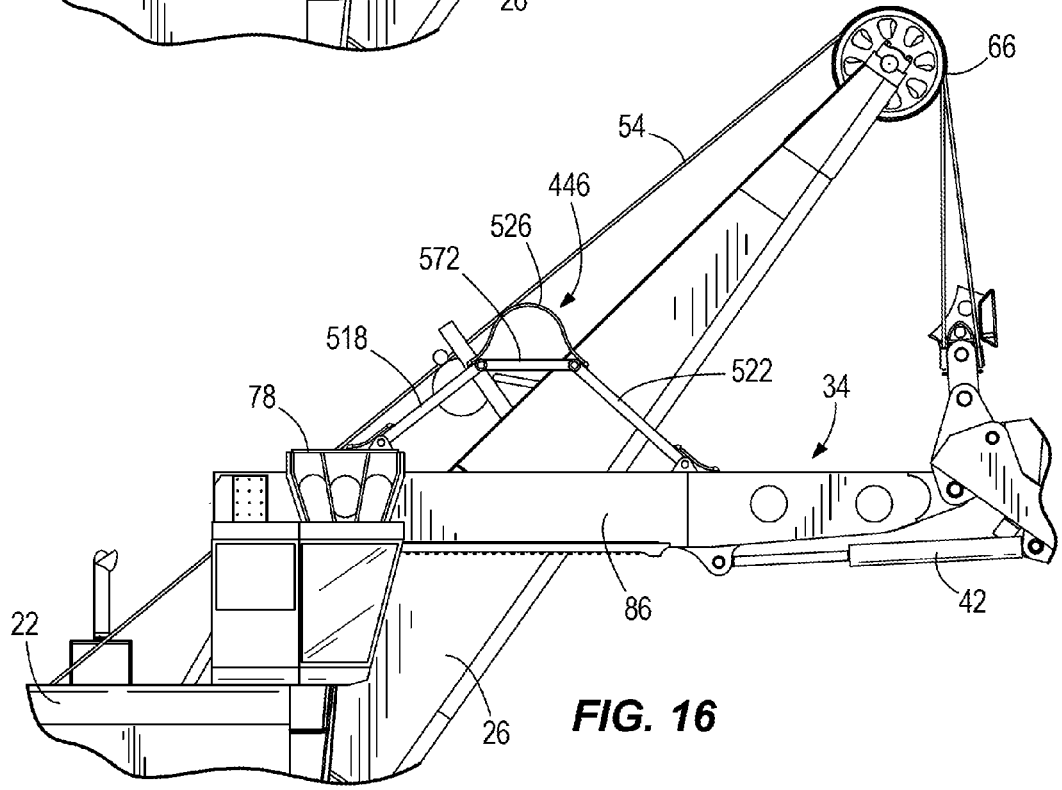
FIG. 16 is a side view of the portion of the mining shovel and the conduit support structure of FIG. 15, with the handle in an extended position.

FIGS. 15 and 16 illustrate another embodiment of a conduit support structure 446. For brevity, only differences between the conduit support structure 446 and the conduit support structure 46 will be described in detail. Similar parts are identified with the same reference number, plus 400.

As shown in FIGS. 15 and 16, the conduit support structure 446 includes a third link 572 coupled between a first link 518 and a second link 522. Conduits 526 are not coupled to the third link 572. The third link 572 provides a minimum distance between the ends of the first link 518 and the second link 522, preventing the conduit 526 from bending beyond a minimum bend radius.

Figure 17:
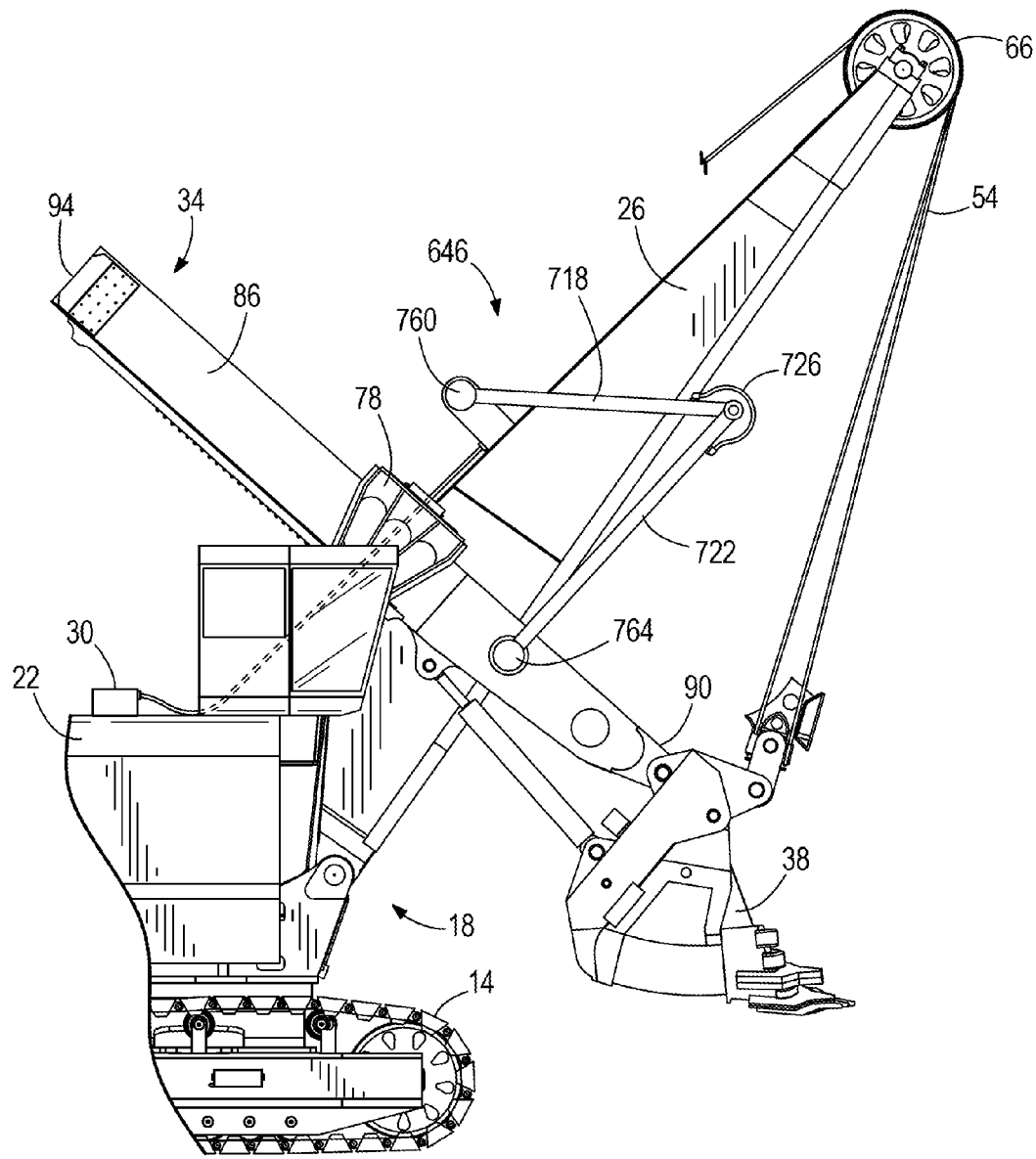
FIG. 17 is a side view of a portion of a mining shovel including a conduit support structure according to another embodiment, with the handle in a retracted position.
Figure 18:
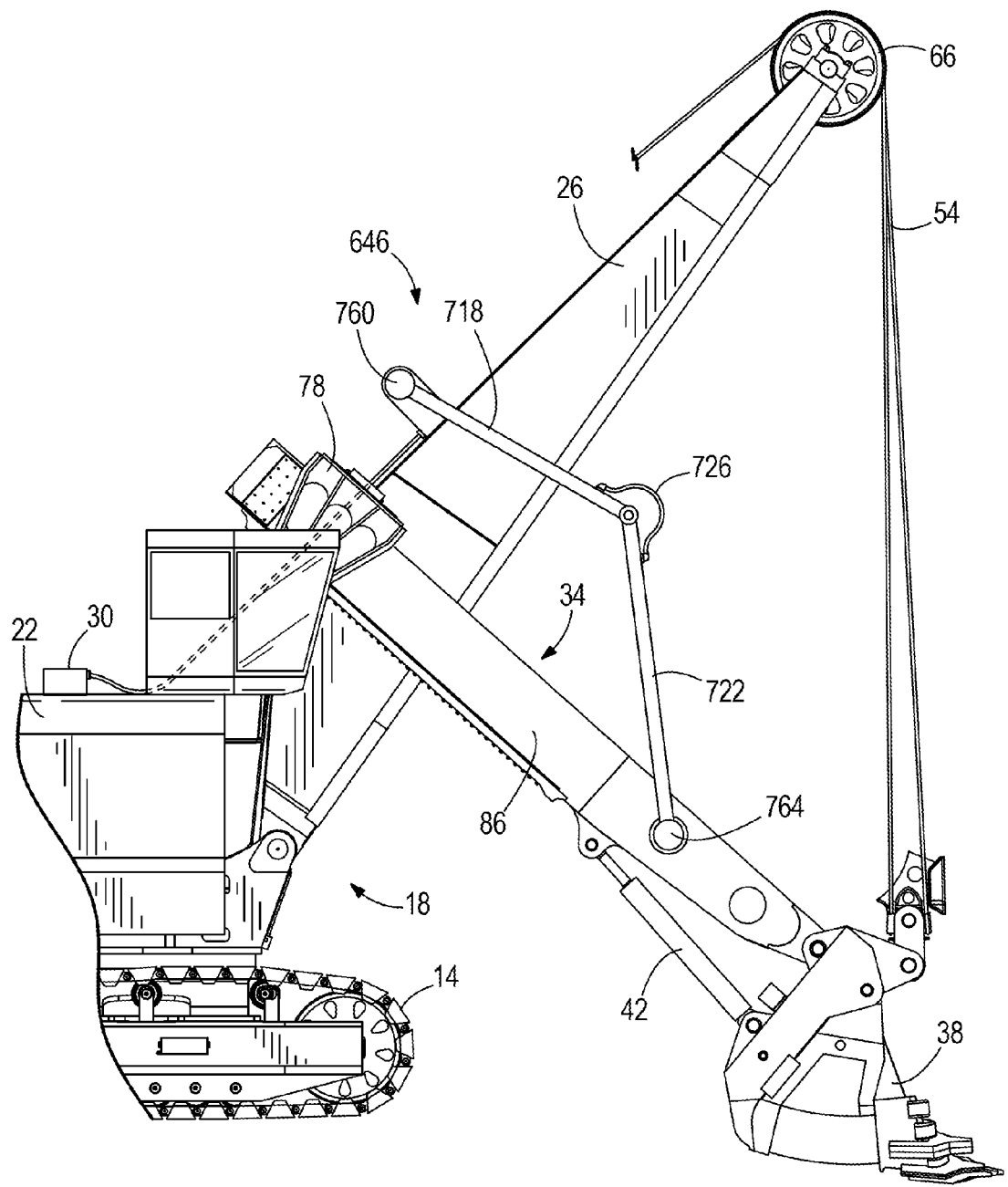
FIG. 18 is a side view of the portion of the mining shovel and conduit support structure of FIG. 17, with the handle in a lowered extended position.
Figure 19:
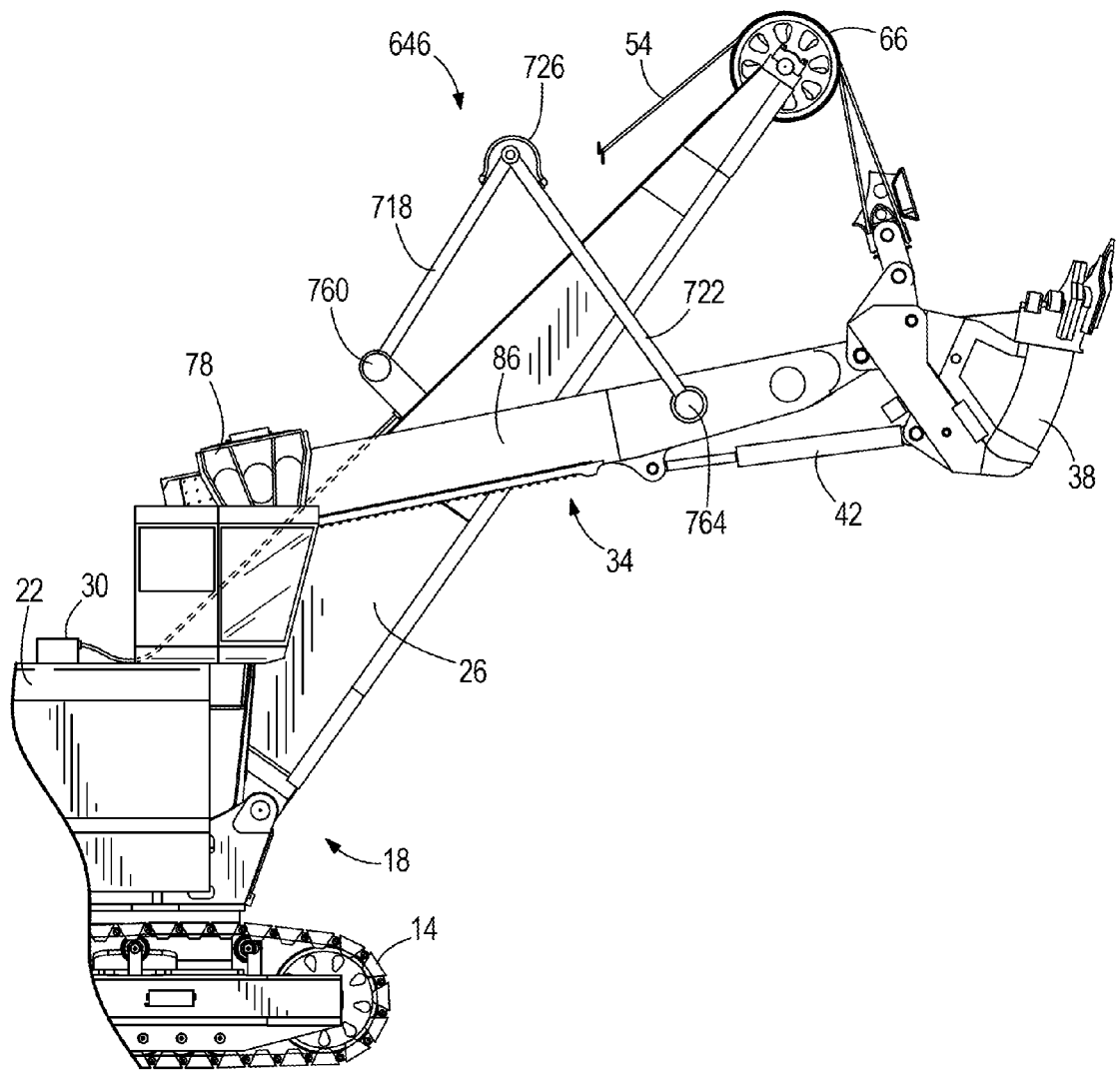
FIG. 19 is a side view of the portion of the mining shovel and conduit support structure of FIG. 17, with the handle in a raised extended position.

FIGS. 17-19 illustrate another embodiment of a conduit support structure 646. For brevity, only differences between the conduit support structure 646 and the conduit support structure 46 will be described in detail. Similar parts are identified with the same reference number, plus 600.

Referring to FIG. 17, a first link 718 is pivotably coupled to the boom 26 and a second link 722 is pivotably coupled between the first link 718 and a portion of the handle 34 at a position between the first end 90 and the second end 94. In one embodiment, the first link 718 is pivotable through approximately 110 degrees, the second link 722 is pivotable through approximately 70 degrees, and the total rotation between the links 718, 722 is approximately 100 degrees. In the illustrated embodiment, the first link 718 is coupled to the boom 26 at a first swivel 760, which is in communication with the fluid source 30, while the second link 722 is coupled to the handle 34 by a second swivel 764. In other embodiments, the links 718, 722 may be coupled to the boom 26 and handle 34, respectively, by pin joints or another type of mechanical connection. The conduit support structure 646 may use one or two collinear pivot points on each of the boom 26 and the handle 30.

The conduit support structure 646 provides a path for fluid lines to connect directly between the boom 26 and the handle 30, and the links 718 and 722 have a shorter length than the links in the embodiments described above. In other embodiments, the pivot point of the first link 718 relative to the boom 26 may be located at a different position, including on the bottom of the boom 26, underneath the handle 30, or protruding from a side of the boom 26.

Figure 20:
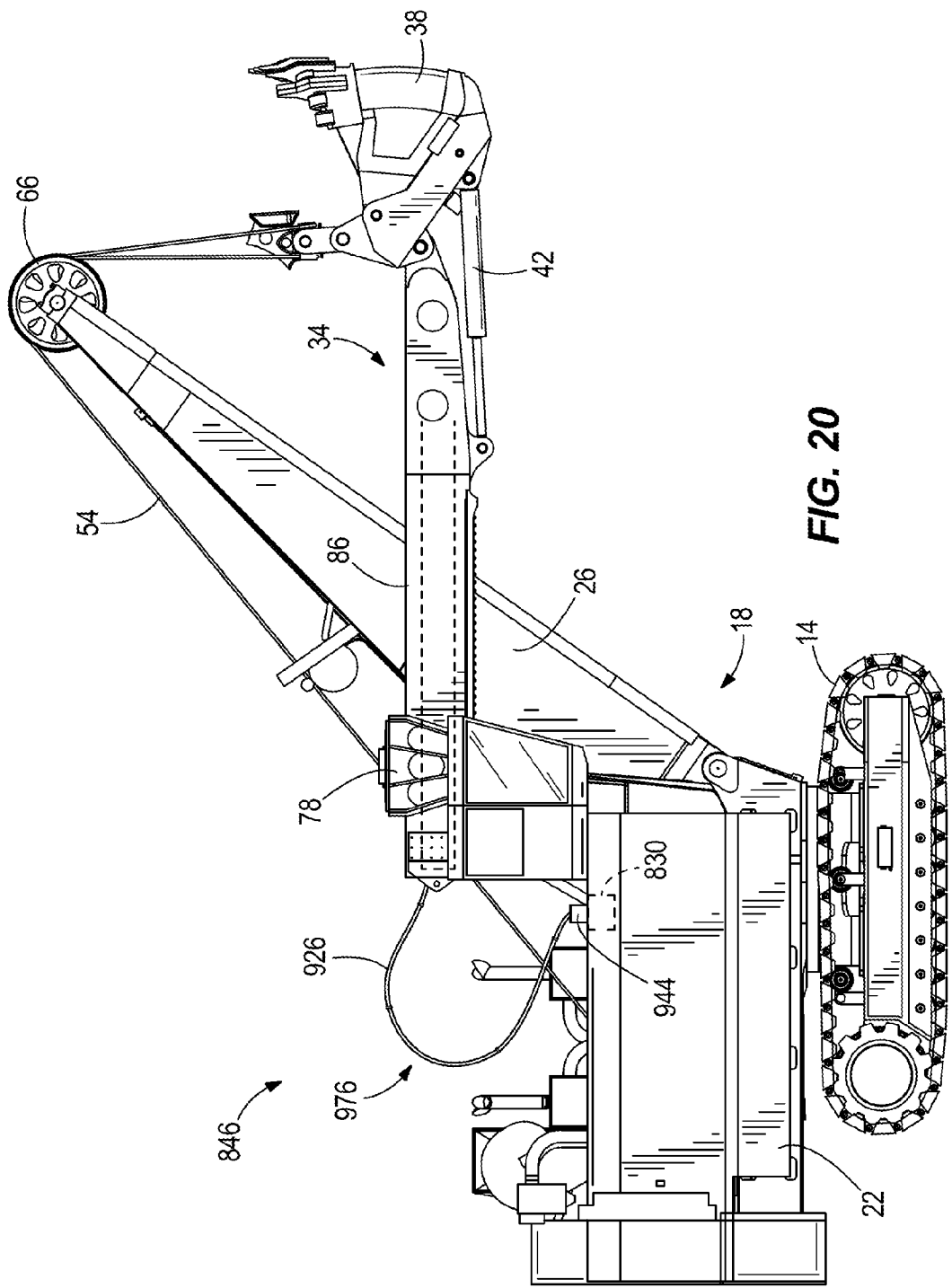
FIG. 20 is a side view of a mining shovel including a conduit support structure according to another embodiment.
Figure 21:
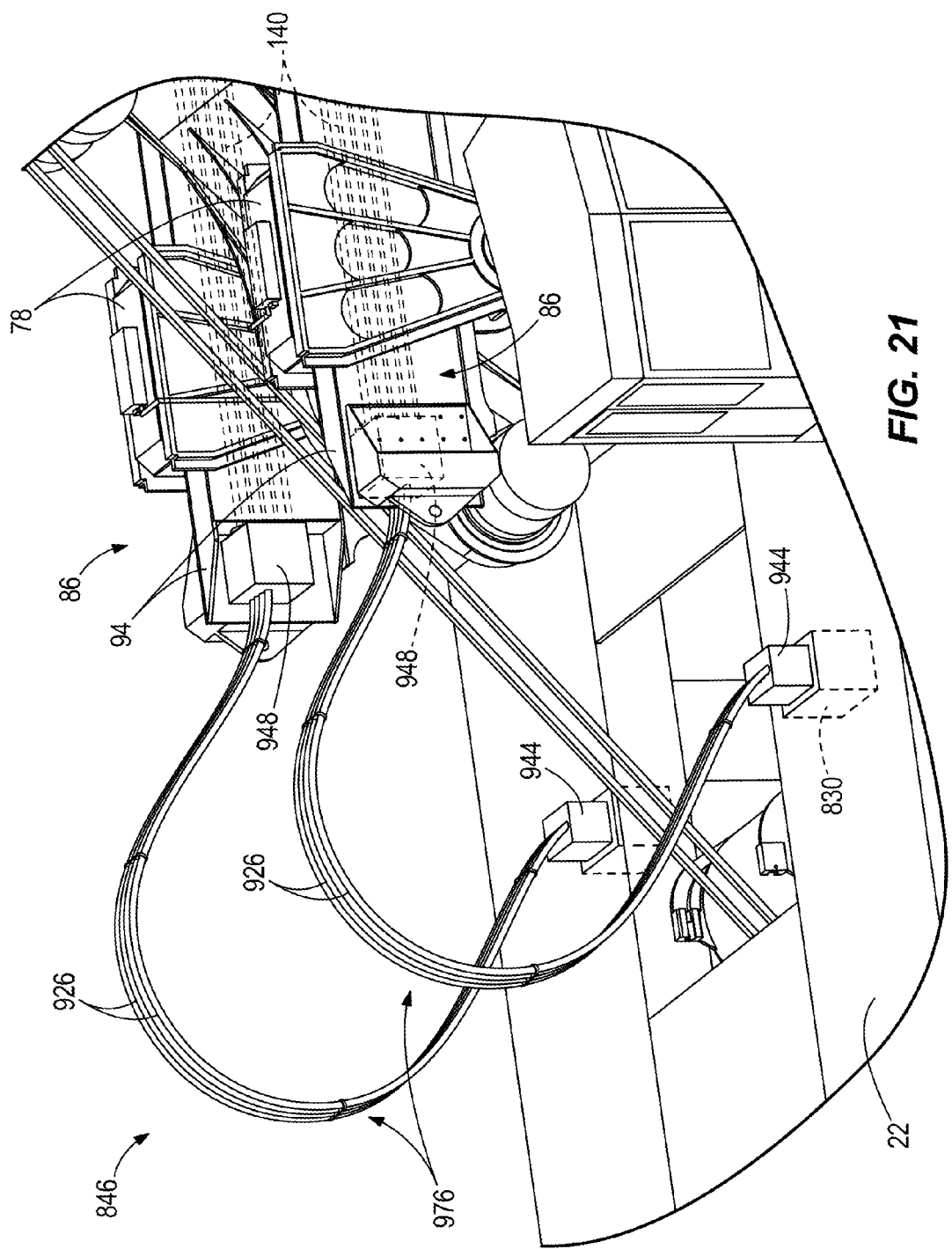
FIG. 21 is a side view of the mining shovel and the conduit support structure of FIG. 20.

FIGS. 20 and 21 illustrate another embodiment of a conduit support structure 846. For brevity, only differences between the conduit support structure 846 and the conduit support structure 46 will be described in detail. Similar parts are identified with the same reference number, plus 800.

In the illustrated embodiment, at least one conduit 926 is in fluid communication with a fluid source 830. The conduits 926 include a flexible portion 976 extending from the base 22 to the second end 94 of the handle 34, where the conduits 926 are in fluid communication with conduits 140 extending along the handle 34. The flexible portion 976 generally maintains a partially circular profile or loop shape in order to accommodate rotational and translational movement of the handle 34 relative to the boom 26.

In addition, each end of the flexible portion 976 is supported away from the coupling between the conduits 926 and the base 22 and the coupling between the conduits 926 and the handle 34. In the embodiment illustrated in FIG. 18, the support structure 846 also includes a first support block 944 coupled to the base 22 and a second support block 948 coupled to the second end 94 of each handle arm 86. Each support block 944, 948 supports a portion of each conduit 926 against the lateral and torsional forces exerted on the conduit 926 due to the movement of the handle 34, thereby reducing stress and wear on the conduits 926 and their associated fittings.

The flexible portion 976 has a length that is sufficient to accommodate any position/movement of the second end 94 of the handle 34. The flexible conduit 976 is coupled directly to the second end 94 of the handle 34, thereby reducing the range that the conduit 976 must accommodate. In one embodiment, the flexible portion 976 is long enough to accommodate the handle 34 and bucket 38 being positioned in a tuck position in which the bucket 38 is retracted inwardly to engage the front of the boom 26 proximate the base 22, and the handle 34 is fully retracted and rotated to a substantially vertical orientation.

In other embodiments, the conduit support structure 846 includes a cable track (not shown) that at least partially supports the flexible portion 976. The cable track allows movement of the conduits 926 within a defined range and guides the motion of the flexible portion 976 in response to motion of the handle 34. In other embodiments, the flexible portion 976 is supported by, for example, a spring.

It is understood that features disclosed in one embodiment above are equally applicable to the other embodiments.

Thus, the invention provides, among other things, a conduit support structure for an industrial machine. Although the invention has been described in detail with reference to certain preferred embodiments, variations and modifications exist within the scope and spirit of one or more independent aspects of the invention as described. Various features and advantages of the invention are set forth in the following claims.

The invention claimed is:

1. An industrial machine comprising:
    a frame including a base and a boom, the boom having a first end coupled to the base and a second end opposite the first end, the frame further including a saddle block pivotably coupled to the boom about an axis positioned between the first end and the second end of the boom;
    an arm movably coupled to the boom and including a first end and a second end, the arm supported by the saddle block for movement relative to the boom;
    an attachment coupled to the first end of the arm;
    a conduit extending between the frame and the attachment;
    a first member pivotably coupled to the saddle block and supporting a first portion of the conduit as the arm moves relative to the boom; and
    a second member pivotably coupled between the first member and the arm and supporting a second portion of the conduit as the arm at least rotates relative to the boom.

2. The industrial machine of claim 1, wherein the first member is pivotably coupled to the second member at a joint, wherein the conduit includes a flexible portion extending around the joint and defining a bend radius, wherein the bend radius of the flexible portion remains above a predetermined minimum level.

3. The industrial machine of claim 1, further comprising a third member pivotably coupled to and extending between the first member and the second member.

4. The industrial machine of claim 1, wherein the first member is coupled to a top surface of the saddle block and the second member is coupled between the first member and a top surface of the arm.

5. The industrial machine of claim 1, wherein the second member pivots relative to the first member about a first axis, and wherein the second member includes a first portion and a second portion pivotably coupled to the first portion, the second portion pivoting relative to the first portion about a second axis that is not parallel to the first axis.

6. The industrial machine of claim 1, wherein the frame supports a fluid source, wherein the conduit is a fluid conduit providing fluid communication between the fluid source and the attachment.

7. The industrial machine of claim 6, wherein the conduit provides a lubricative fluid to a mechanical coupling on at least one of the attachment and the arm.

8. The industrial machine of claim 6, wherein the attachment includes a bucket coupled to the first end of the arm and an actuator for actuating the bucket, wherein the conduit provides pressurized fluid from the fluid source to the actuator.

\* \* \* \* \*